US012342098B2

(12) United States Patent
Bhatt et al.

(10) Patent No.: US 12,342,098 B2
(45) Date of Patent: Jun. 24, 2025

(54) SYSTEM AND METHOD FOR GENERATING VIRTUAL BACKGROUND FOR PEOPLE FRAMES

(71) Applicant: Hewlett-Packard Development Company, L.P., Spring, TX (US)

(72) Inventors: Rajen Bhatt, Pittsburgh, PA (US); Kui Zhang, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 315 days.

(21) Appl. No.: 18/048,213

(22) Filed: Oct. 20, 2022

(65) Prior Publication Data

US 2024/0137466 A1 Apr. 25, 2024
US 2024/0236271 A9 Jul. 11, 2024

(51) Int. Cl.
*H04N 7/14* (2006.01)
*G06T 7/70* (2017.01)
(Continued)

(52) U.S. Cl.
CPC ............ *H04N 7/147* (2013.01); *G06T 7/70* (2017.01); *G06V 10/25* (2022.01); *H04L 65/403* (2013.01);
(Continued)

(58) Field of Classification Search
None
See application file for complete search history.

(56) References Cited

U.S. PATENT DOCUMENTS 8,773,498 B2 * 7/2014 Lindbergh ............. H04N 19/17
348/14.08
8,982,179 B2 * 3/2015 North ................. H04N 21/8146
348/14.14
(Continued)

FOREIGN PATENT DOCUMENTS

GB 2607573 A * 12/2022 ............... G06T 3/00

OTHER PUBLICATIONS

"Background Segmentation", OpenCV, 2 pages. Retrieved from the Internet: URL: https://docs.opencv.org/4.x/d6/d17/group__cudabgsegm.html.
(Continued)

*Primary Examiner* — Quoc D Tran
(74) *Attorney, Agent, or Firm* — Quarles & Brady LLP

(57) ABSTRACT

A videoconference system acquires images during a videoconference. A still image may be analyzed to identify persons participating in the videoconference. A first frame is generated for each person and represents a subsection of an image that focuses on the face of that person. These first frames may include unpleasant components. Background segmentation is performed on each first frame to remove or diminish such unpleasant components. For example, a second frame for a person may be generated by identifying the background segments in the first frame and blurring or replacing such background segments with a virtual background. When the second frames are put together, the differences in the first frames are obscured making it more pleasing to view. A composite stream of the second frames is generated, per layout rules, and sent to the far side for improved viewing of the participants at the far side.

25 Claims, 4 Drawing Sheets

(51) Int. Cl.
   *G06V 10/25*   (2022.01)
   *H04L 65/403*  (2022.01)
   *H04N 7/15*    (2006.01)
   *G06T 7/194*   (2017.01)

(52) U.S. Cl.
   CPC ............. *H04N 7/152* (2013.01); *G06T 7/194* (2017.01); *G06T 2207/30201* (2013.01); *G06T 2207/30242* (2013.01)

(56) References Cited

U.S. PATENT DOCUMENTS

| | | | | |
|---|---|---|---|---|
| 9,270,941 | B1* | 2/2016 | Lavelle | H04N 23/695 |
| 11,082,661 | B1* | 8/2021 | Pollefeys | H04N 7/15 |
| 12,081,899 | B2* | 9/2024 | Han | H04N 5/2628 |
| 2012/0050323 | A1* | 3/2012 | Baron, Jr. | H04L 12/1818 345/632 |
| 2020/0099889 | A1* | 3/2020 | Sugihara | H04N 7/147 |
| 2023/0353612 | A1* | 11/2023 | Springer | H04N 7/15 |
| 2024/0031529 | A1* | 1/2024 | Chu | H04N 7/15 |
| 2024/0104699 | A1* | 3/2024 | Master Ben-Dor | G06T 3/40 |

OTHER PUBLICATIONS

"Image segmentation", Wikipedia, 23 pages. Retrieved from the Internet: on Oct. 5, 2022. URL: http://en.wikipedia.org/wiki/Image_segmentation.

Maindola, Gaurav, "4 Image Segmentation Techniques in OpenCV Python", Sep. 7, 2021, 12 pages. Retrieved from the Internet: URL: https://machinelearningknowledge.ai/image-segmentation-in-python-opencv/.

Mallick, Satya, "Image Segmentation", LearnOpenCV, Nov. 5, 2018, 6 pages. Retrieved from the Internet: URL: https://learnopencv.com/image-segmentation/.

Rosebrock, Adrian, "Instance segmentation with OpenCV", Nov. 26, 2018, 24 pages. Retrieved from the Internet: URL: https://pyimagesearch.com/2018/11/26/instance-segmentation-with-opencv/.

* cited by examiner

Layout of First Frames
210

Layout of Second Frames
220

SYSTEM AND METHOD FOR GENERATING VIRTUAL BACKGROUND FOR PEOPLE FRAMES

BACKGROUND

Cameras associated with an endpoint device acquire images of a conference room depicting persons participating in a videoconference. Images of additional persons participating in the videoconference virtually may also be acquired by the cameras associated with the endpoint device. A frame is created for each person participating in the videoconference to focus on the face of that person. Such frames may include background objects or distortion that is unpleasant to a viewer.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
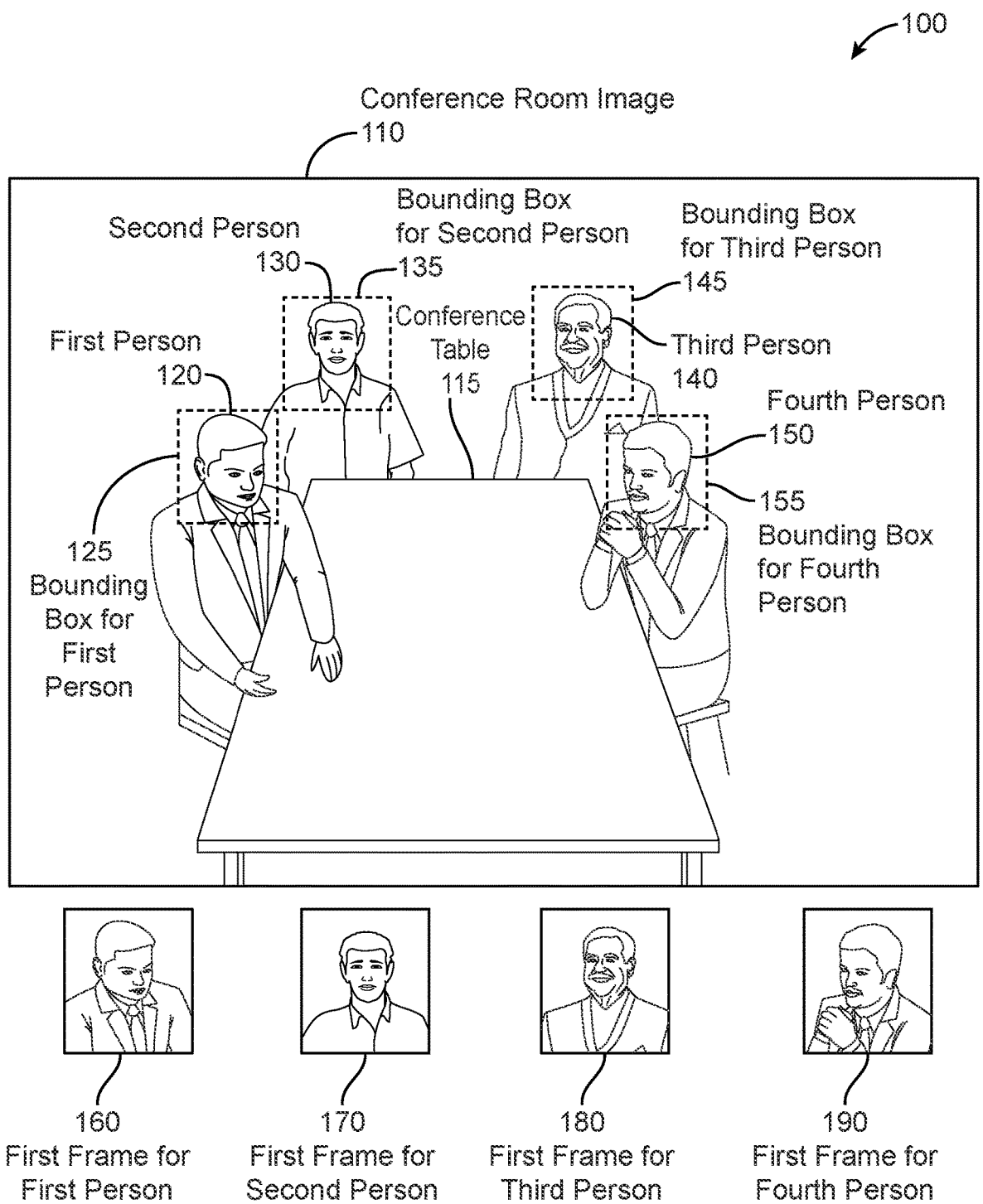
FIG. 1 illustrates a conference room image and the resulting first frames for all persons depicted in the conference room image, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An endpoint device is a device that acquires images and audio data during a videoconference using a combination of cameras and speakers. The images acquired by the endpoint device may depict persons sitting in a conference room and participating in the videoconference. The images may also include images of other persons participating in the videoconference virtually, such as persons working from a home office. The images may then be cropped to generate a first frame for each person participating in the videoconference. These first frames may depict the face of each person participating in the videoconference plus other objects that may be in the background. For example, a frame depicting a face of a first person may include a background object such as a chair that the person is sitting on, a window that is located behind the person's face, an arm or hand of another person that is sitting or standing right next to the first person, and so on.

The first frames of the persons participating in a videoconference are combined to generate a layout of first frames. This layout of first frames is then transmitted to the far side via a network, where the far side includes a second endpoint device. The second endpoint device may display the layout of the first frames to enable viewing of the participants of the videoconference.

Using the first frames of the persons in combination in a layout, however, may include unpleasant components. The first unpleasant component is that each individual first frame may include background objects, such as background furniture or objects, that appear repetitively overlapped in each first frame. Another unpleasant component is that the geometry of the background in each first frame is not perfectly straight, and thus, there may be geometric distortion within the first frames. Yet another unpleasant component is that the visible body parts of other participants may be included in the background of the first frame of a person, if other participants are standing or seated next to or behind that person.

Described in this disclosure are techniques for removing these unpleasant components from the first frames and thus providing a better far end experience. The unpleasant components in the first frames may be improved by performing background segmentation on each individual first frame. An image segmentation algorithm is performed by the endpoint device using each individual first frame as an input. Image segmentation involves a process of classifying each pixel in the first frame that belongs to a particular label. Such labels may include a face and/or body of a person, background objects, background users, and so on. The output of the image segmentation algorithm separates the person in the first frame from background segments of the first frame. Examples of image segmentation include semantic segmentation, instance segmentation, panoptic segmentation, and so on.

Once identified, a second frame for each person participating in the videoconference may be generated by modifying the background segments in each individual first frame. For example, a second frame for a first person may be generated by modifying the background segments in the first frame for that first person. In one embodiment, the second frame for the first person may be generated by blurring the background segments that were present in the first frame for that first person. In another embodiment, one or more virtual backgrounds may be generated at the endpoint device. The second frame for the first person may be generated by replacing the background segments in the first frame of that person with one of the virtual backgrounds.

In some embodiments, image segmentation is performed on each first frame for each person. This results in the generation of a second frame for each person based on the image segmentation results for the corresponding first frame of that person. After that, a composite stream of all the second frames for all the persons may be generated and sent out to the far end. Alternatively, image segmentation may also be performed on a composite stream of first frames instead of performing image segmentation on the individual first frames. The result would also be a composite stream of second frames that is sent to the far end. Given that the background segments in the first frames have been blurred or replaced with a virtual background, the composite stream of second frames provides a better viewing experience at the far end.

Illustrative System

FIG. 1 depicts at 100 a conference room image 110 depicting a scenario in a conference room. For example, the conference room image 110 depicts a conference table 115 and four persons, depicted as person 120, person 130, person 140, and person 150, sitting around the conference table 115.

The conference room image 110 is analyzed by a video module at an endpoint device. The video module processes the conference room image 110 and performs image processing techniques. For example, the video module may utilize one or more classifiers, trained neural networks, and so forth to detect heads or faces of persons depicted in the conference room image 110. The head detector algorithm outputs bounding boxes around the head or face of each person detected. In one embodiment, the head detector algorithm outputs a first bounding box for the first person 125, a second bounding box for the second person 135, a third bounding box for the third person 145, and a fourth bounding box for the fourth person 155.

Details may be determined for each bounding box. Such details may include coordinate information which describes pixel locations for each bounding box within the conference room image 110. As an example, coordinate information for the bounding box for the first person 125 may include a pixel location for one or more of a top left corner, top right corner, bottom left corner, bottom right corner, a center pixel, and so on. The same coordinate information may be determined for each of the bounding boxes.

In some embodiments, size information may also be determined for each bounding box. The size information may describe the size of each bounding box in pixels, including a height of the bounding box and a width of the bounding box. The size of the bounding boxes may be similar for all detected heads in the conference room image 110 or it may vary. For example, the size of the bounding box for the first person 125 may be larger than the size of the bounding box for the second person 135 given that the camera that acquires the conference room image 110 may be closer to the first person 120 than the second person 130 and thus the head of the first person 120 may appear larger than the head of the second person 130 in the conference room image 110.

Other information about each person may be determined in some embodiments. For example, an identity of the face of the person in the corresponding bounding box may be made. In addition, a confidence level may also be determined to indicate the confidence level that the identity made is a match to a person.

The information about the detected heads and the bounding boxes may be used to determine framing for each person in the conference room image 110. A frame for an individual person comprises a sub-section or region of interest of an image that is centered on the face of that person, such that the frame includes the face of the person and a small area around the face. The framing decisions made by an endpoint device may be based on the size information and the location information for a bounding box.

As shown, a first frame for first person 160 represents a sub-section of the conference room image 110 that is focused on the face of the first person 120. Likewise, a first frame for second person 170 represents a different sub-section of the conference room image 110 that is focused on the face of the second person 130. A first frame for third person 180 represents a sub-section of the conference room image 110 that is focused on the face of the third person 140. Finally, a first frame for fourth person 190 represents another sub-section of the conference room image 110 that is focused on the face of the fourth person 150.

By determining a frame for each person in a conference room image 110, the videoconference experience may be improved. This is because displaying the first frames helps users focus on the faces of the persons involved in the videoconference, as the persons talk and interact. A combined stream of the first frames may be generated and used to send to the far end for viewing. For example, a stream of the first frames 160-190 may be generated and sent to the far end, where a second endpoint device may present the stream of first frames for tracking videoconference participants.

In some scenarios, other images may be captured/acquired using other cameras that are coupled to the endpoint device. For example, an endpoint device may include one or more host cameras that acquire the conference room image 110 depicting four persons participating in a videoconference. The endpoint device may also be coupled to other cameras that acquire images of other participants in other locations, such as persons working remotely from their home office. Once a first frame has been generated for all participants, those frames are combined in a layout of first frames.

Figure 2:
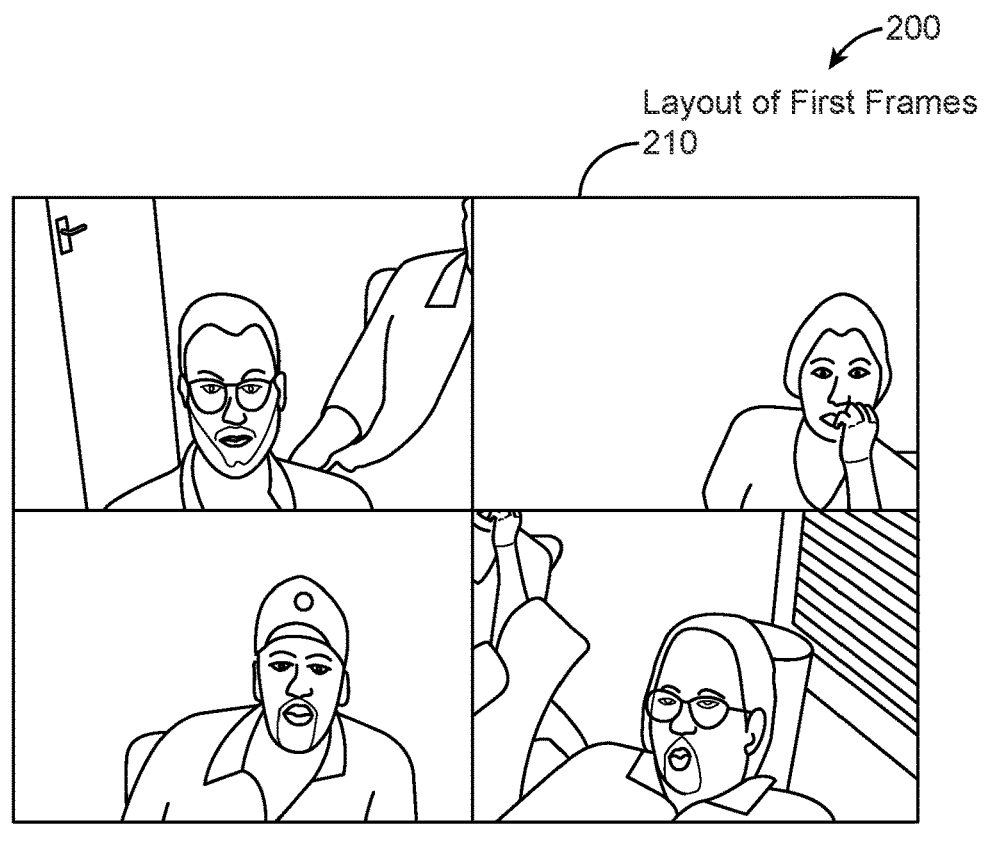
FIG. 2 illustrates a first layout of first frames for the persons participating in a videoconference and a second layout of second frames that represent modified first frames having the background segments replaced with a virtual background, according to some implementations.
Figure 2:
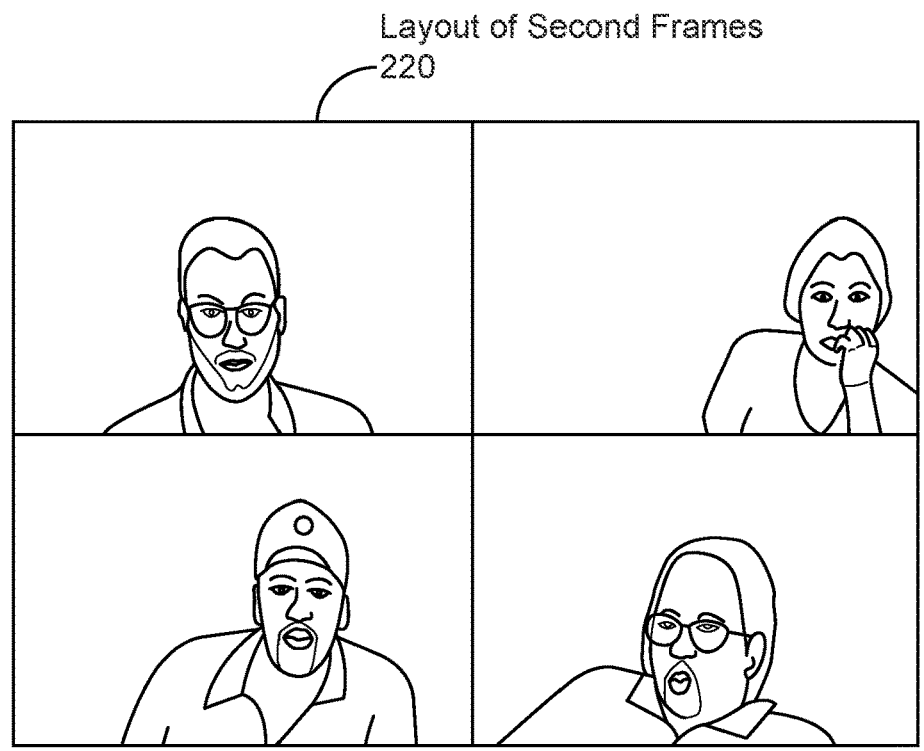

FIG. 2 depicts at 200 a layout of first frames 210 of the different persons participating in a videoconference. The layout of first frames 210 depicts four frames corresponding to four persons participating in a videoconference, which can be comparable to the four persons 120-150 depicted in the conference room image 110 in FIG. 1. The layout of first frames 210 is such that the frames are presented in a 2×2 array. Other layouts may also be utilized. For example, the layout of the same first frames may include having the four frames in a 1×4 array or a 4×1 array.

A specific layout of frames to be used by a display may vary based on a number of factors. For example, the specific layout of first frames 210 may depend on the number of persons or frames involved. A layout of 6 or less persons is preferable, with several different possibilities for presentation. In other embodiments, the layout of first frames 210 may depend on the preferences or capabilities of the endpoint device that generates the layout of first frames 210 or a display device coupled thereto. In even further embodiments, the layout of first frames 210 may be determined based on the preferences or capabilities of other endpoint devices that will receive the layout of first frames 210, or a second display device coupled thereto.

The first frames depicted in the layout of first frames 210 represent sub-sections of a conference room image that are primarily focused on each person. As shown, the first frames within the layout of first frames 210 are focused on the four persons, but some of these first frames also include parts of chairs, windows, doors, additional persons, and so on that are in the background area near the face of the person. Such objects are distracting when these first frames are combined and presented at the far side.

As an example, the top left frame in the layout of first frames 210 includes a main face of a person, along with a door, parts of a body of another person in the background, and a part of a chair the other person is sitting in. The top right frame in the layout of first frames 210 includes a face of a person and a small part of a chair that the person is sitting in. Likewise, the bottom left frame in the layout of first frames 210 depicts a face of a person and a small part of a chair on which that person is sitting in. The bottom right frame in the layout of first frames 210 depicts the face of a person, as well as part of a chair the person is sitting in, a window behind that person, parts of a body of another person in the background, as well as part of a chair that other person is sitting in.

In order to improve the presentation of the first frames, an image segmentation algorithm may be executed with the individual first frames as an input. Specifically, each individual first frame depicted in the layout of first frames 210 may be analyzed by an image segmentation algorithm to identify background segments in each first frame.

An image segmentation algorithm is performed by the endpoint device using individual first frames as an input. Image segmentation involves a process of classifying each pixel in the first frame with a particular label. These labels may include a face and/or body of a person, background objects, background users, and so on. The output of the image segmentation algorithm separates the person in the first frame from background segments of the first frame. Examples of image segmentation include semantic segmentation, instance segmentation, panoptic segmentation, and so on.

In one implementation, the image segmentation may utilize a semantic segmentation algorithm. The semantic segmentation algorithm may perform a per-pixel assessment that determines a semantic label or semantic information with the respective pixel. In some implementations, the semantic segmentation algorithm may utilize discontinuity detection, similarity detection, thresholding, or a previously trained machine learning systems such as a neural network, classifier, and so forth. For example, discontinuity detection may determine a boundary between one segment and another based on change between adjacent pixels exceeding a threshold. In another example, similarity detection may be used to grow a segment if the pixel being examined is deemed to be similar to an adjacent pixel. In yet another example, a convolutional neural network (CNN) may be trained to perform semantic segmentation on input data.

In another implementation, the image segmentation may utilize an instance segmentation algorithm. The instance segmentation algorithm may perform a per-pixel assessment that determines an object label or object information with the respective pixel. For example, the instance segmentation may attempt to determine a set of pixels that are associated with a single person. In some implementations the image segmentation algorithm may utilize discontinuity detection, similarity detection, or a previously trained machine learning systems such as a neural network, classifier, and so forth. For example, discontinuity detection may determine a boundary between one segment and another based on change between adjacent pixels exceeding a threshold. In another example, similarity detection may be used to grow a segment if the pixel being examined is deemed to be similar to an adjacent pixel. In yet another example, a convolutional neural network (CNN) may be trained to perform instance segmentation on input data.

Some implementations of semantic segmentation may be combined. In one implementation semantic and instance segmentation may be combined to identify a semantic label and an object label for every pixel. In some implementations the panoptic segmentation may utilize discontinuity detection, similarity detection, or a previously trained machine learning systems such as a neural network, classifier, and so forth. For example, discontinuity detection may determine a boundary between one segment and another based on change between adjacent pixels exceeding a threshold. In another example, similarity detection may be used to grow a segment if the pixel being examined is deemed to be similar to an adjacent pixel. In yet another example, a convolutional neural network (CNN) may be trained to perform panoptic segmentation on input data.

Once the background segments in a first frame are identified, such background segments may be modified in some manner. In one embodiment, the background segments may be blurred. In other embodiments, one or more virtual backgrounds may be generated at the endpoint device. The background segments may be replaced by one of the virtual backgrounds. A similar modification may be made to each of the four first frames or to a select number of the first frames. A second frame is generated when the background segments in the first frame have been modified or replaced.

This process of identifying background segments in a first frame and modifying the background segments is performed on each individual first frame to generate individual second frames. Alternatively, the identification of the background segments and the modification of the background segments may be performed on the composite of the first frames to generate a composite of the second frames.

The composite stream of second frames may be combined according to a layout which may be the same or different from the layout of first frames 210. As shown, the layout of second frames 220 represents a layout of the second frames for each person. For example, the background segments in each of the four first frames is blurred or replaced with a virtual background and then displayed according to the same layout as the layout of first frames 210 to generate the layout of second frames 220. As shown, the background segments in the first frames that depicted background chairs, windows, doors, parts of other persons, etc. have been removed from the second frames and replaced with a blank virtual background, as depicted in the layout of second frames 220.

The combined effect of removing the background segments in each of the first frames provides for a cleaner and less distracting view of the participants of a videoconference at a far end. For example, the comparison of the layout of first frames 210 versus the layout of second frames 220 shows that the focus of the second frames is on the participating persons in a cleaner and more focused way, thereby improving the far end viewing experience.

Figure 3:
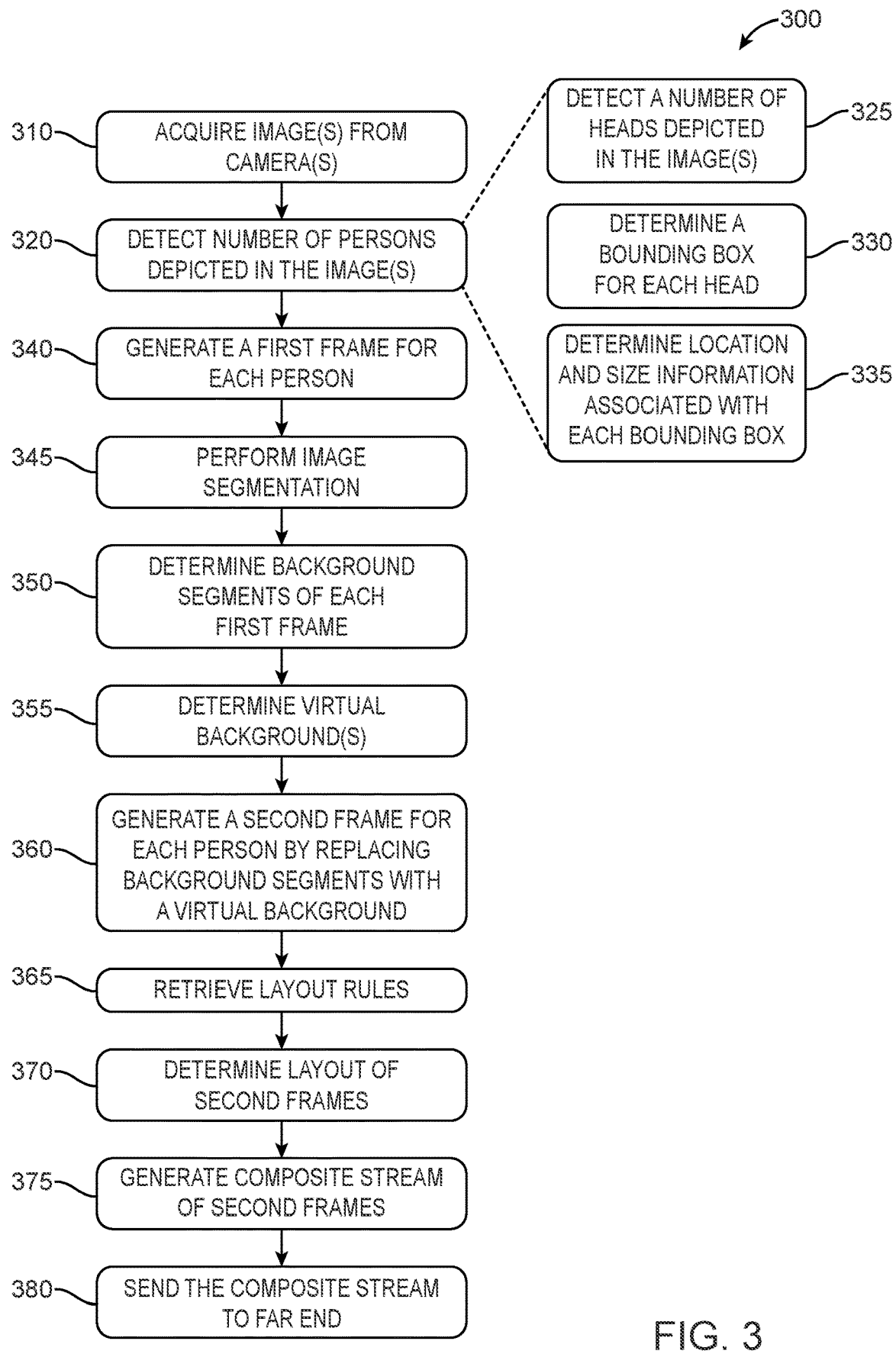
FIG. 3 illustrates a flow diagram of a process to generate first frames of persons participating in a videoconference, generate second frames for those persons to replace the background segments in the first frames with a virtual background, and generate a composite stream of second frames, according to some implementations.

FIG. 3 illustrates a process 300 to identify background segments in the first frames of persons and replace such background segments with a virtual background. At 310, one or more images are acquired from one or more cameras. The images acquired at 310 may be acquired from one or more cameras, such as host cameras (embedded within an endpoint device) or external cameras that are coupled to the endpoint device. In other embodiments, the images acquired at 310 may be acquired by cameras that are at different locations, such as cameras that are located in a home office and the images from that camera may be transmitted to the endpoint device.

The images acquired at 310 may represent still images that are captured while a videoconference is being conducted. For example, the process 300 may be performed for a first still image when the videoconference is initiated and repeated at different times throughout the length of the videoconference.

Some pre-processing may be performed on the acquired images. For example, the acquired images may undergo some color conversions, such as conversion from YUV to RGB. Some scaling of the acquired images may also be performed.

At 320, a number of persons depicted in the images may be detected. There are a number of ways to detect persons in an image. One way to detect persons in an image is illustrated as steps 325-335. At 325, an acquired image may be processed by a head detector algorithm to detect heads depicted in the image via image recognition techniques and then determine a number of heads depicted in the image. At 330, a bounding box is determined for each head depicted in the image. The bounding box may represent a region of interest associated with a person.

At 335, location and size information associated with each bounding box is determined. The location information relates to a pixel location of each bounding box within an acquired image (such as pixel locations of particular corners or a center point of the bounding box). The size information relates to a width or height dimension of the bounding box within the acquired image.

A confidence score may also be assigned to each bounding box. This confidence score indicates a confidence associated with the identification of a head, an identification of a particular person, and so on.

At 340, a first frame is generated for each person detected in the acquired image. The bounding box location, size information, and confidence scores may be used to determine a framing region or region of interest within an acquired image to focus on the face of the person. For example, a first frame for a first person may be determined based on the bounding box location of the head and the dimensions of the bounding box. The size of the first frames may be different for different persons, particularly if the different persons are at different distances from the camera that acquires the images. These first frames may be resized as needed to have equal sized frames for each person.

At 345, image segmentation may be performed for each individual first frame. At 350, the background segments in each individual first frame may be determined. Different classifiers or blob connectivity approaches may be used to determine the background segments within each first frame. In addition, the image segmentation process may be performed by an image segmentation algorithm that involves neural networks and the like.

Once the background segments in a first frame have been identified, different effects may be applied to those background segments. In one embodiment, one or more virtual backgrounds may be determined at 355. These virtual backgrounds may be generated locally at an endpoint device and may involve a solid background color, a pattern, a blurred background, and so on. At 360, a second frame may be generated for each person involved. Each second frame may be generated by replacing the background segments in the individual first frame for each person with one of the virtual backgrounds. Alternatively, the second frame for each person may be generated by applying a blurring filter on the first frames for each person.

At 365, layout rules may be retrieved. These layout rules may be specific to an endpoint device or a number of participants in a videoconference. For example, the layout rules may specify an array layout to be used for a given number of persons. The layout rules may also specify the type of layout to be used for displaying the stream of second frames on display, given the capabilities of such a display. In yet another embodiment, the layout rules may also depend on the capabilities of a receiving endpoint device or a device coupled thereto.

At 370, the layout of the second frames is determined based on the layout rules retrieved. A composite stream of the second frames is generated at 375. This composite stream of second frames may involve laying out the second frames according to the layout determined at 370, in the particular order or arrangement of the layout. Once generated, the composite stream of second frames may be sent to the far end. At the far end, the composite stream of second frames may be received and displayed to enable viewing of the participants of the videoconference in a clean and non-distracting manner.

Figure 4:
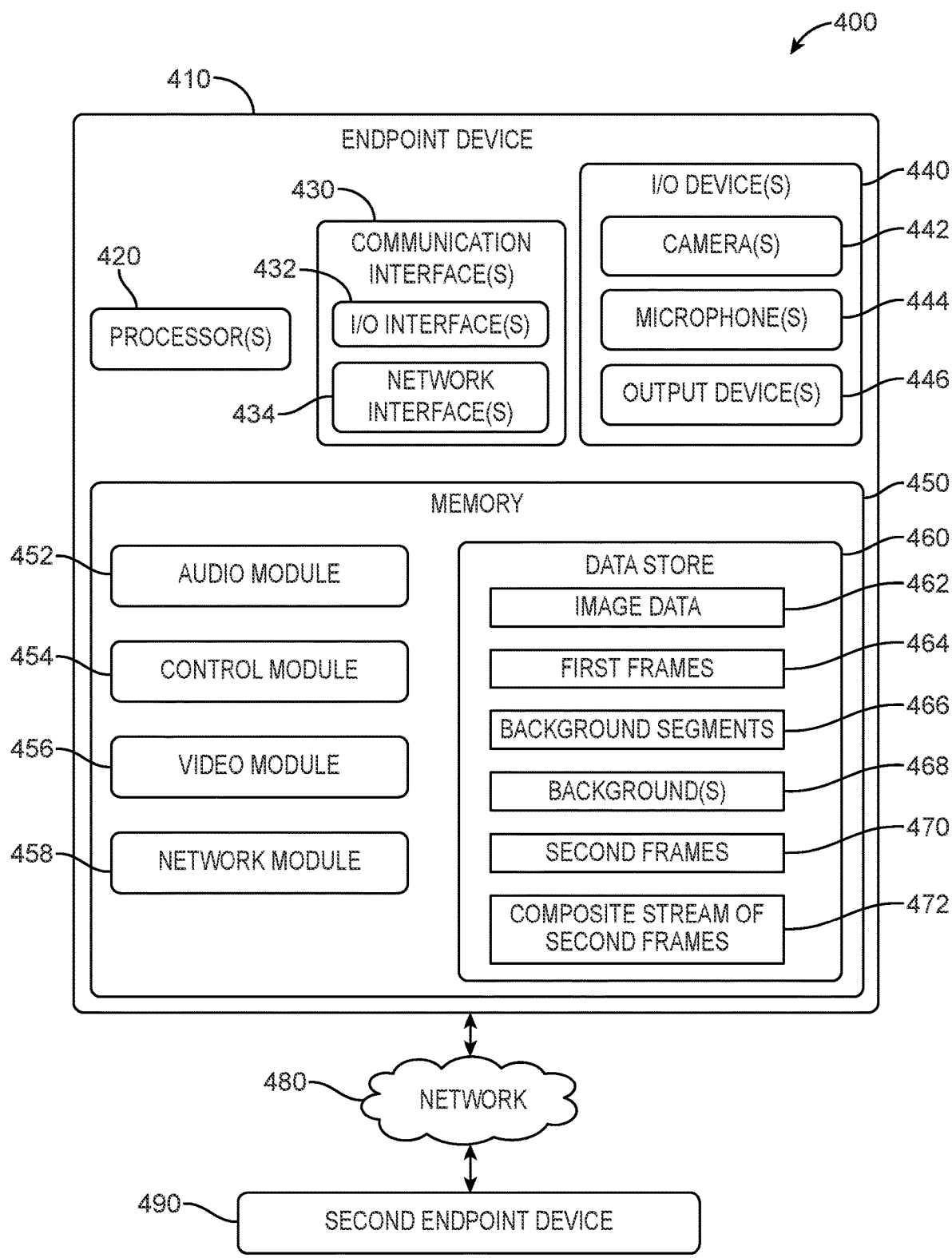
FIG. 4 illustrates a block diagram of an endpoint device to generate first frames of persons, generate second frames of persons with the background segments in the first frames replaced with a virtual background, and generate a composite stream of second frames, according to some implementations.

FIG. 4 depicts at 400 a block diagram of an endpoint device 410 that performs the framing, background segmentation, replacement of background segments, and generation of a composite of second frames with the virtual backgrounds applied on the background segments. The endpoint includes processor(s) 420 to help operate the various components of the endpoint device 410. For example, the processor(s) 420 may comprise a microcontroller, system on a chip (SoC), single board computer, and so forth. In one implementation, the processor(s) 420 may operate communication interfaces 430 and I/O devices 440. The processors 420 are configured to execute stored instructions.

The endpoint device 410 further includes the communication interface(s) 430 such as input/output (I/O) interfaces 432, network interfaces 434, and so forth. The communication interface(s) 430 enable the endpoint device 410, or components thereof, to communicate with other devices or components. The I/O interface(s) 430 may comprise Inter-Integrated Circuit (I2C), Serial Peripheral Interface bus (SPI), Universal Serial Bus (USB) as promulgated by the USB Implementers Forum, RS-232, and so forth. The network interface(s) 434 may be configured to provide communications between the endpoint device 410 and other endpoint devices, routers, access points, and so forth. The network interface(s) 434 may include devices configured to couple to personal area networks (PANs), local area networks (LANs), wireless local area networks (WLANS), wide area networks (WANs), and so forth. For example, the network interfaces 434 may include devices compatible with Ethernet, Wi-Fi, Bluetooth, ZigBee, and so forth.

The I/O interface(s) 432 may couple to one or more I/O device(s) 440. The I/O device(s) 440 may include devices such as camera(s) 442, microphone(s) 444, and so forth. The I/O device(s) 440 may also include output device(s) 446 such as one or more of a display device, printer, audio speakers, and so forth. In some embodiments, the I/O device(s) 446 may be physically incorporated with the endpoint device 410 or may be externally placed.

The camera(s) 442 are configured to generate image data 462, send the image data 462 to other components or devices, and so forth. The camera(s) 442 may include imaging sensors configured to acquire images of a scene, such as a conference room.

The I/O device(s) 446 also include microphone(s) 444. The microphone(s) 444 may be configured to acquire information indicative of sound present in an environment, such as a conference room. In some implementations, arrays of microphones 444 may be used.

Other output device(s) 446 may also be part of the endpoint device 410.

The endpoint device 410 also includes a memory 450 with various modules, including an audio module 452, a control module 454, a video module 456, and a network module 458. The memory 450 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 450 provides storage of computer-readable instructions, data structures, program modules, and other data for the operation of the endpoint device 410. A few example functional modules are shown stored in the memory 450, although the same functionality may alternatively be implemented in hardware, firmware, or as a system on a chip (SoC).

The audio module 452 performs audio processing for audio data acquired by the I/O devices 440, such as analyzing audio data for sound source localization. The control module 454 controls the various I/O devices, such as the cameras 442. For example, based on camera settings, the control module 454 may direct the movement of the cameras 442, such as a pan or tilt of the cameras 442.

The video module 456 performs various processing of images acquired by the cameras 442. Such analysis includes facial recognition techniques or object recognition techniques that help identify persons in a conference room. For example, the video module 456 may process image data 462 from the cameras 442 to detect faces, heads, or bodies of users, as well as background objects or parts of other users.

The network module 458 outputs audio and video data to a remote endpoint device via a network 480. The network module 458 also receives audio and video via the network 480 and sends that to the audio module 452 and/or the video module 456 for processing.

Also stored in the memory 450 may be a data store 460. The data store 460 may use a flat file, database, linked list, tree, executable code, script, or other data structure to store information. In some implementations, the data store 460 or a portion of the data store 460 may be distributed across one or more other devices. As shown, the data store 460 may store image data 462 that is acquired by the cameras 442. The data store 460 also stores first frames 464 that are generated for the persons detected in the image data 462. The resulting data from the image segmentation process is stored at background segments 466.

The virtual backgrounds 468 that are stored locally on the endpoint device 410 may be stored in the data store 460. The data store 460 also stores second frames 470, which represents the modified first frames 464 that replace the background segments with the virtual backgrounds 468. The composite of second frames 472 may also be stored within the data store 460.

A second endpoint device 490 may be connected to the endpoint device 410 via the network 480. The second endpoint device 490 may send and receive audio data and/or image data 462 during a videoconference.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program may be configured to access, including signals transferred by one or more networks. For example, the transitory machine-readable signal may comprise transmission of software by the Internet.

Separate instances of these programs may be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above may be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system (400) comprising:
 a first endpoint device (410) comprising:
   one or more cameras (442);
   a first memory (450) storing first computer-executable instructions; and
   a first hardware processor (420) coupled to the one or more cameras (442) and the first memory (450),
 wherein the first hardware processor (420) is to execute the first computer-executable instructions to:
   acquire one or more first images from the one or more cameras (310);
   determine one or more persons depicted in the one or more first images (320);
   generate a first frame for each person of the one or more persons depicted in the one or more first images (340), wherein the first frame for a person comprises a portion of the one or more first images that depicts a face of the person;
determine one or more background segments of each first frame (350);
determine one or more backgrounds (355);
generate a second frame for said each person by replacing the one or more background segments of the first frame of said each person with one of the one or more backgrounds (360); and
determine, based on characteristics of a second endpoint device (490), a layout of the second frame (365, 370).

2. The system of claim 1, the first hardware processor to further execute the first computer-executable instructions to:
determine one or more heads depicted in the one or more first images (325); and
determine at least a portion of the first frame associated with said each person based on a location of the one or more heads within the one or more first images (335, 320).

3. The system of claim 1, wherein the one or more background segments of said each first frame are determined using an image segmentation algorithm (345).

4. The system of claim 1, the first hardware processor to further execute the first computer-executable instructions to:
determine one or more heads depicted in the one or more first images (325);
determine a bounding box corresponding to each head of the one or more heads depicted in the one or more first images (330);
determine coordinates associated with each bounding box (335); and
determine size information associated with said each bounding box (335),
wherein the first frame associated with said each person is generated using the coordinates and size information (335, 320, 340).

5. The system of claim 1, the first hardware processor to further execute the first computer-executable instructions to:
retrieve layout rules (365) from the group consisting of:
a number of the one or more persons detected in the one or more first images,
characteristics of the first endpoint device, and
characteristics of the second endpoint device,
wherein the layout of the second frame is determined based on the layout rules (365).

6. The system of claim 1, wherein the one or more cameras (442) comprise an embedded camera and an external camera coupled to the first endpoint device.

7. The system of claim 1, wherein:
the one or more backgrounds comprise a first background and a second background (355);
the second frame for a first person is generated by replacing the one or more background segments of the first frame of the first person with the first background (360); and
the second frame for a second person is generated by replacing the one or more background segments of the first frame of the second person with the second background (360).

8. The system of claim 1, the first hardware processor to further execute the first computer-executable instructions to:
determine a first head depicted in the one or more first images (325);
determine a first person associated with the first head (320);
generate the first frame associated with the first person (340);
determine one or more first segments of the first frame associated with the first person that are connected to the first head (345);
determine one or more second segments of the first frame associated with the first person that are not connected to the one or more first segments (345); and
designate the one or more second segments of the first frame associated with the first person as a portion of the one or more background segments of the first frame associated with the first person (345).

9. A method (300) comprising:
acquiring one or more first images from one or more cameras associated with a first endpoint device (310);
determining one or more persons depicted in the one or more first images (320);
generating a first frame for each person of the one or more persons depicted in the one or more first images (340), wherein the first frame for a person comprises a portion of the one or more first images that depicts a face of the person;
determining one or more background segments in each first frame (350);
determining one or more backgrounds (355);
generating a second frame for said each person by replacing the one or more background segments of the first frame for said each person with one of the one or more backgrounds (360);
determining, based on characteristics of a second endpoint device (490), a layout of the second frame (365, 370);
generating, based on the first-layout, a composite stream of the second frames (375); and
sending the composite stream of the second frames (380).

10. The method of claim 9, further comprising:
determining one or more heads depicted in the one or more first images (325);
determining a bounding box corresponding to each head of the one or more heads depicted in the one or more first mages (330); and
determining location and size information associated with each bounding box (335),
wherein the first frame associated with said each person is generated using the location and size information associated with said each bounding box (320, 340).

11. The method of claim 9, wherein the determining the one or more background segments in said each first frame is performed using an image segmentation algorithm (345, 350).

12. The method of claim 9, further comprising:
retrieving layout rules (365) from the group consisting of:
a number of the one or more persons detected in the one or more first images,
characteristics of the first endpoint device, and
characteristics of the second endpoint device,
wherein the layout of the second frame is is determined based on the layout rules (370).

13. The method of claim 9, wherein the one or more cameras (442) associated with the first endpoint device comprise an embedded camera and an external camera coupled to the first endpoint device.

14. The method of claim 9, wherein:
the one or more backgrounds comprise a first background and a second background (355);

the second frame for a first person is generated by replacing the one or more background segments of the first frame of the first person with the first background (360); and the second frame for a second person is generated by replacing the one or more background segments of the first frame of the second person with the second background (360).

15. The method of claim 9, further comprising:

determining a first head depicted in the one or more first images (325);

determining a first person associated with the first head (320);

generating the first frame associated with the first person (340);

determining one or more first segments of the first frame associated with the first person that are connected to the first head (345, 350);

determining one or more second segments of the first frame associated with the first person that are not connected to the one or more first segments (345, 350); and designating the one or more second segments of the first frame associated with the first person as a portion of the one or more background segments of the first frame associated with the first person (345, 350).

16. A method (300) comprising:

acquiring one or more first images from one or more cameras associated with a first endpoint device (310);

determining one or more persons depicted in the one or more first images (320);

generating a first frame for each person of the one or more persons depicted in the one or more first images (340), wherein the first frame for a person comprises a portion of the one or more first images that depicts a face of the person;

determining one or more background segments in each first frame (350);

determining a first background (355);

determining a second background (355);

generating a second frame for said each person by replacing the one or more background segments of the first frame for said each person with the first background or the second background (360);

determining, based on characteristics of a second endpoint device (490), a layout of the second frames (365, 370); and generating, based on the layout, a composite stream of the second frames (375).

17. The method of claim 16, further comprising:

determining one or more heads depicted in the one or more first images (325);

determining a bounding box corresponding to each head of the one or more heads depicted in the one or more first mages (330); and determining location and size information associated with each bounding box (335), wherein the first frame associated with said each person is generated using the location and size information associated with said each bounding box (335, 320, 340).

18. The method of claim 16, wherein the determining the one or more background segments in said each first frame is performed using an image segmentation algorithm (345).

19. The method of claim 16, further comprising:

sending the composite stream of second frames to a second endpoint device (380).

20. The method of claim 16, further comprising:

determining a first head depicted in the one or more first images (325);

determining a first person associated with the first head (320);

generating the first frame associated with the first person (340);

determining one or more first segments of the first frame associated with the first person that are connected to the first head (345, 350);

determining one or more second segments of the first frame associated with the first person that are not connected to the one or more first segments (345, 350); and designating the one or more second segments of the first frame associated with the first person as a portion of the one or more background segments of the first frame associated with the first person (345, 350).

21. The method of claim 16, wherein the first endpoint device (410) is connected to the second endpoint device (490) via a network (480).

22. The method of claim 9, wherein the first endpoint device (410) is connected to the second endpoint device (490) via a network (480).

23. The system of claim 1, wherein the first endpoint device (410) is connectable to the second endpoint device (490) via a network (480).

24. The system of claim 1, wherein the second endpoint device (490) is to display the layout of the first frames.

25. The system of claim 1, wherein the first hardware processor (420) is to execute the first computer-executable instructions to:

generate, based on the layout, a composite stream of second frames (375); and send the composite stream of the second frames (380).

* * * * *